(12) United States Patent
Li et al.

(10) Patent No.: US 11,356,005 B2
(45) Date of Patent: Jun. 7, 2022

(54) ROTOR, STATOR AND MULTI-WORKING-HARMONIC PERMANENT MAGNET MOTOR

(71) Applicant: Huazhong University of Science and Technology, Hubei (CN)

(72) Inventors: Dawei Li, Hubei (CN); Kangfu Xie, Hubei (CN); Ronghai Qu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 862 days.

(21) Appl. No.: 16/060,890

(22) PCT Filed: Jun. 7, 2017

(86) PCT No.: PCT/CN2017/087372
§ 371 (c)(1),
(2) Date: Jun. 8, 2018

(87) PCT Pub. No.: WO2018/209738
PCT Pub. Date: Nov. 22, 2018

(65) Prior Publication Data
US 2020/0287450 A1     Sep. 10, 2020

(30) Foreign Application Priority Data
May 15, 2017   (CN) .................. 201710338980.X (51) Int. Cl.
*H02K 1/27*     (2022.01)
*H02K 1/17*     (2006.01)
(Continued)

(52) U.S. Cl.
CPC ............. *H02K 21/16* (2013.01); *H02K 1/14* (2013.01); *H02K 1/17* (2013.01); *H02K 1/24* (2013.01); *H02K 1/2773* (2013.01); *H02K 16/02* (2013.01)

(58) Field of Classification Search
CPC ............ H02K 21/16; H02K 1/14; H02K 1/17; H02K 1/24; H02K 1/2773; H02K 21/44;
(Continued)

(56) References Cited

U.S. PATENT DOCUMENTS

| | | | |
|---|---|---|---|
| 6,762,520 B1 * | 7/2004 | Ehrhart | H02K 1/20 310/208 |
| 2005/0264120 A1 * | 12/2005 | Hiruma | H02K 37/14 310/156.44 |

(Continued)

FOREIGN PATENT DOCUMENTS

| | | |
|---|---|---|
| CN | 1702946 A | 11/2005 |
| CN | 101420160 A | 4/2009 |

(Continued)

OTHER PUBLICATIONS

International Search Report and Written Opinion issued in PCT/CN2017/087372, dated Feb. 13, 2018, 9 pages.

*Primary Examiner* — Thomas Truong
(74) *Attorney, Agent, or Firm* — Hamre, Schumann, Mueller & Larson, P.C.

(57) ABSTRACT

The present invention discloses a stator, a rotor and a multi-working-harmonic permanent magnet motor using the above rotor and the stator, wherein the N poles and the S poles are alternately distributed in a circumference direction of the rotor core or the stator core; any N pole comprises at least one N-pole permanent magnet; any S pole comprises at least one S-pole permanent magnet; and at least two adjacent N pole and S pole has different widths. According to the invention, through the arrangement of magnetic poles with (Continued)

different widths on a rotor or a stator, it is possible to generate magnetic fields containing a plurality of harmonic magnetic fields with high amplitudes so that the harmonic magnetic fields can interact with the magnetic fields generated by the armature windings of the permanent motor to realize the superposition of multi-part torques, thereby further enhancing the outputted torque of the motor. In addition, with the invention, the harmonic permanent fields can be completely decoupled on the frequency, thereby significantly improving the fault tolerance performance of the motor, and as a dual-mechanical-port motor, the motor of the invention can be applied to electric vehicles and other relevant variable transmission field.

13 Claims, 9 Drawing Sheets

(51) Int. Cl.
  *H02K 21/16* (2006.01)
  *H02K 1/14* (2006.01)
  *H02K 1/24* (2006.01)
  *H02K 1/276* (2022.01)
  *H02K 16/02* (2006.01)

(58) Field of Classification Search
  CPC ........ H02K 1/276; H02K 29/03; H02K 21/14; H02K 16/00–16/04; Y02T 10/64
  See application file for complete search history.

(56) References Cited

U.S. PATENT DOCUMENTS

| | | | |
|---|---|---|---|
| 2010/0283345 A1* | 11/2010 | Atallah | H02K 11/048 310/114 |
| 2012/0169163 A1* | 7/2012 | Imai | H02K 21/14 310/71 |
| 2014/0300217 A1* | 10/2014 | Lim | H02K 16/04 310/43 |
| 2016/0087517 A1* | 3/2016 | Powell | H02K 16/00 310/103 |

FOREIGN PATENT DOCUMENTS

| | | |
|---|---|---|
| CN | 201910684 U | 7/2011 |
| CN | 104917310 A | 9/2015 |
| CN | 105337433 A | 2/2016 |
| JP | 2009284716 A | 12/2009 |
| JP | 2009303372 A | 12/2009 |

* cited by examiner

ROTOR, STATOR AND MULTI-WORKING-HARMONIC PERMANENT MAGNET MOTOR

BACKGROUND OF THE PRESENT INVENTION

Field of the Present Invention

The present invention belongs to the technical field of permanent magnet motor, and more particularly relates to a rotor, a stator and a multi-working-harmonic permanent magnet motor.

Description of the Related Art

As an electromagnetic device that realizes the conversion of electromechanical energy or signals, a motor, ranging from a large hydro-generator with a unit capacity of 1,200 megawatts to a small and special motor with a unit capacity of several microwatts, is widely used in every aspect of the national economy. According to the statistics, in China, more than 60% of annual power generation is consumed by various electric motors and converted into mechanical power. Since the birth of the first motor in the 1820s, the motor has been developed for nearly two hundred years, and the motor industry has become an indispensable industrial category that supports modern society.

The successful development of the third-generation high-performance rare earth permanent magnet materials in the 1980s has injected new vitality into the development of the motor industry. The introduction of the permanent magnet excitation mode, especially the application of the rare earth permanent magnet material with high magnetic energy product, eliminates excitation windings, brushes and slip rings, and makes the motor structure simpler. Moreover, compared with the excitation windings, the machine employing rare earth permanent magnet material with high magnetic energy products has a larger air gap flux density, so that with the same power, the motor is smaller in size and higher in power-mass ratio, and meanwhile, without excitation windings, excitation losses are eliminated and motor efficiency is further improved.

In addition, the shape and size of the permanent magnet motor can be flexible and diverse. In recent years, many novel permanent magnet machines with different structures, such as permanent magnet flux switching machine, flux reversal machine, Vernier permanent magnet machine and dual-mechanical-port machine, have been proposed, and these different types of motors are all operated based on the basic principle of electromechanical energy conversion.

According to the principle of electromechanical energy conversion, to generate a stable torque by the interaction of the magnetic fields of the stator and the rotor, three conditions must be met at the same time: 1) the number of pole pairs of the stator magnetic fields is equal to the number of pole pairs of the rotor magnetic fields; 2) the magnetic field rotation speed and direction of the stator are the same as that of the rotor; and 3) the magnetic field axes of the stator and the rotor cannot be collinear. Whether conventional induction motors and synchronous motors or subsequently proposed various novel motors, and whether the excitation and armature magnetic fields are generated by the permanent magnets or the winding current, all are operated based on these three conditions.

In the above conditions, the number of pole pairs refers to the number of peaks or troughs of sinusoidally distributed flux density waveform, which is actually obtained by Fourier decomposition of the motor airgap magnetic field. In the actual waveform of airgap magnetic field, there are various harmonics and each harmonic corresponds to one number of pole pairs. Generally, in a permanent magnet motor, only one pole pair field harmonic with relatively high amplitude can be utilized, and thus is called the working harmonic, also called fundamental harmonic or main harmonic, while other harmonics with a small amplitude are called non-working harmonics. The ratio of the number of pole pairs of the non-working harmonics to the number of pole pairs of the working harmonic is called harmonic order, and the number of pole pairs corresponding to the working harmonic is called the number of pole pairs of the motor.

In a case of a constant output power, the larger the number of pole pairs of the motor, the lower the rotational speed of the motor and the larger the torque of the motor. Therefore, when selecting or designing a motor, the output torque is firstly considered, then a rotational speed is determined according to the torque, and finally the number of pole pairs is determined by the rotational speed.

The relationship between the synchronous speed and the number of pole pairs of motor is as follows:

$$n = 60\frac{f}{p}$$

where f represents the input current frequency in Hz; n represents the rotational speed in r/min; and p represents the number of pole pairs.

According to the above formula, knowing the current frequency f and the required rotational speed n during the motor running, the number of pole pairs of p can be solved, then it is determined that the rotor (or stator) with p pairs of N pole and S pole should be designed, and then according to the magnetic pole distribution of the rotor (or stator), the winding pole pair of the stator (or rotor) can be determined, thereby completing the motor design.

Generally, in a permanent magnet motor, the number m of permanent magnets is directly used as the number of poles. Accordingly, the magnetization direction and arrangement of the permanent magnets determine the arrangement of N poles and S poles. If the total number of N and S poles is m, the number of pole pairs of the motor is p=m/2.

Figure 1A:
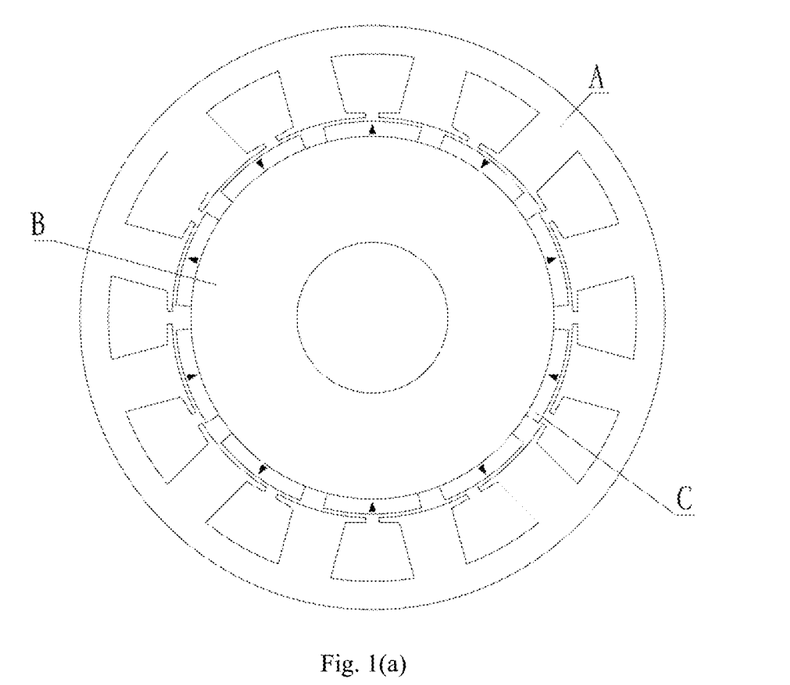
FIG. 1(a) is a schematic structural diagram of a permanent magnet motor in the prior art.
Figure 1B:
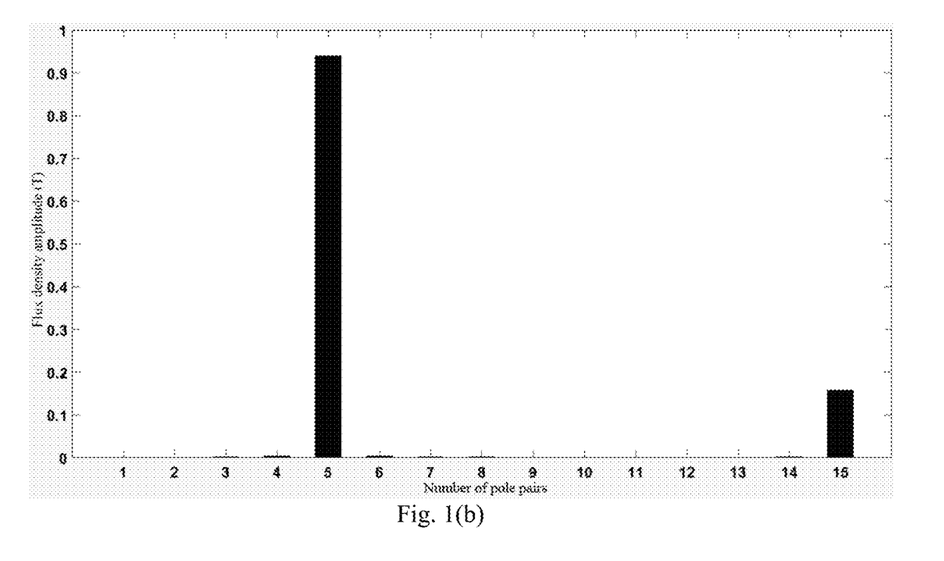
FIG. 1(b) is a diagram showing flux density amplitude distribution in FIG. 1(a)

With reference to FIG. 1(a), the shown motor is a common permanent magnet motor designed according to the above principle, and includes a stator A, a rotor core B, and 5 pairs of permanent magnets C with opposite polarity which are uniformly distributed in the circumference direction of the rotor core B. The number of pole pairs and the flux density amplitude distribution are shown in FIG. 1(b). In this motor, 10 permanent magnets C with the same size and different magnetization directions form 5 pairs of N pole and S pole, and thus, the number of pole pairs is 5. The permanent magnets C are uniformly distributed on the surface of the rotor core B to generate a magnetic field corresponding to the number of pole pairs of 5 in the motor air gap, which interacts with armature magnetic field corresponding to the number of pole pairs of 5 generated by the windings on the stator A to achieve electromechanical energy conversion.

Since all the permanent magnets in the above scheme have the same size, the air gap flux density waveforms corresponding to the five pairs of poles are closer to square waves, so that for the air gap flux density waveform of the permanent magnetic motor in FIG. 1(a), there are large number of non-working harmonics and the sine degree of back electromotive force is poor, resulting in large torque ripple and unstable output. In theory, the ideal state should be that there are only working harmonics, but no non-working harmonics. However, in fact, the non-working harmonics are difficult to completely eliminate.

Figure 2A:
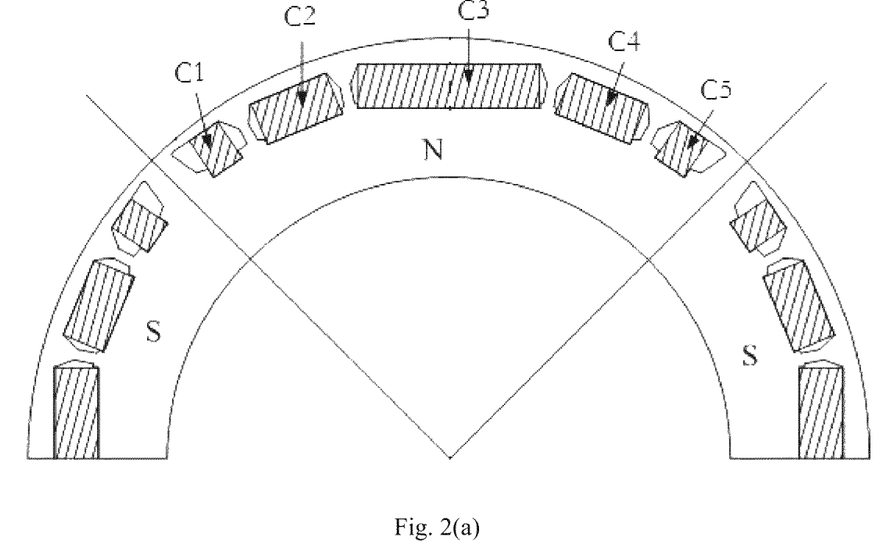
FIG. 2(a) is a schematic structural diagram of another permanent magnet motor in the prior art.
Figure 2B:
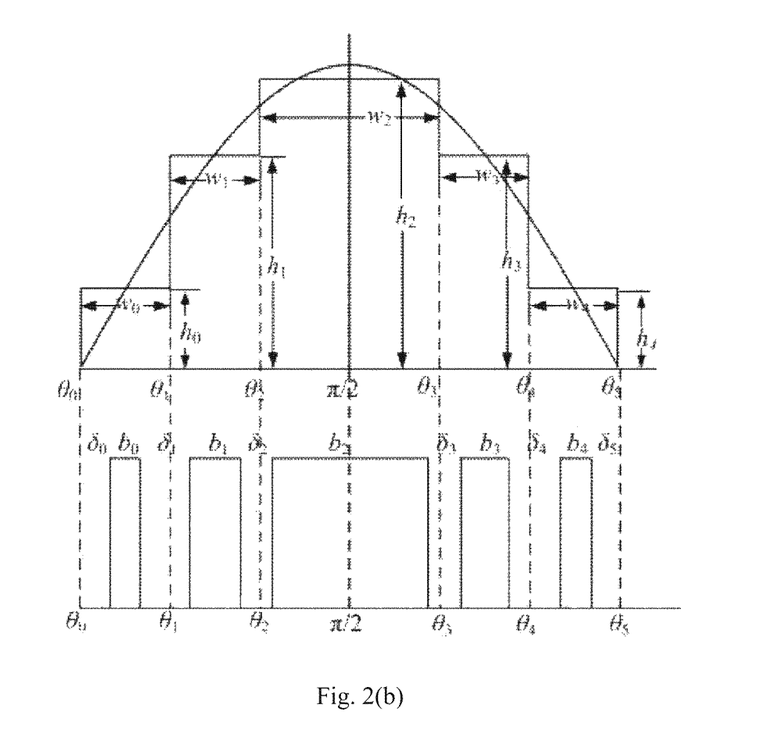
FIG. 2(b) is a diagram showing flux density amplitude distribution in FIG. 2(a)

An existing solution to solve the above problem is shown in FIG. 2(a). The improved permanent magnet motor shown in FIG. 2(a) differs from the permanent magnet motor shown in FIG. 1(a) mainly in that the monolithic permanent magnet C, which is originally one magnetic pole, is divided into a plurality of small permanent magnets C1 to C5 with the same polarity, and the width of the original magnetic pole is not changed. Through adjusting the width of the small permanent magnets C1 to C5, the sine degree of the air gap flux density distribution corresponding to the number of pole pairs is improved, and the air gap flux density distribution corresponding to the improved width of the permanent magnets C1 to C5 is shown in FIG. 2(b), and the overall waveform of the working harmonics corresponding to the number of pole pairs is closer to the sine, which effectively suppress non-working harmonic components and reduce the torque ripple. Although in this scheme, the original monolithic permanent magnet is divided into a plurality of small pieces, the plurality of small permanent magnets still need to be regarded as a whole, and together constitute a magnetic pole. Thus, the total number of magnetic poles is not changed, and the number of pole pairs is also not changed, namely, the above definition and formula for the number of poles and the number of pole pairs are still met.

However, due to the limitation of the above-mentioned conventional design ideas, the above two types of permanent magnet motors can only generate a magnetic field with only one working harmonic, and thus, the torque density and fault tolerance are limited. With the development of different emerging industries such as electric vehicles, industrial robots, and more electric aircraft, the performance of the existing motors has been difficult to meet requirements, and how to achieve higher torque density and better fault-tolerant performance has also become an important direction in the research of electrical engineering.

SUMMARY OF THE PRESENT INVENTION

In view of the above-described problems, the present invention provides a stator, a rotor and a corresponding permanent magnet motor with higher torque density and better fault tolerance.

In order to achieve the above objective, the present invention provides a rotor, comprising: a rotor core, a plurality of N poles and a plurality of S poles, wherein the N poles and the S poles are alternately distributed in a circumferential direction of the rotor core; any N pole includes at least one N-pole permanent magnet, and any S pole includes at least one S-pole permanent magnet; and at least one pair of adjacent N pole and S pole has different widths.

Further, at least one N pole and one S pole are symmetrical about the axis of the rotor core, and have the same width.

Further, all the N-pole permanent magnets are replaced with the material of the rotor core, so that the S poles and the rotor core form a consequent-pole structure, or all the S-pole permanent magnets are replaced with the material of the rotor core, so that the N poles and the rotor core form a consequent-pole structure.

Further, in order to achieve the above objective, the present invention provides a multi-working-harmonic permanent magnet motor comprising the rotor in any one of the preceding paragraphs.

Further, the motor further comprises a stator and a plurality of modulation blocks, in which the plurality of modulation blocks are uniformly distributed between the stator and the rotor and are rotatable about the axis of the rotor, and the modulation blocks and the rotor jointly form a double mechanical output port.

Further, the materials of the modulation blocks, the rotor core and the stator core are all silicon steel.

In order to achieve the above objective, the present invention provides a stator, wherein the rotor core of the rotor in any one of the preceding paragraphs is replaced with a stator core.

In order to achieve the above objective, the present invention provides a multi-working-harmonic permanent magnet motor, comprising the stator the previous paragraph.

In general, compared with the prior art, the present invention has the following beneficial effects:

Through the arrangement of magnetic poles with different widths on a rotor or a stator, it is possible to generate magnetic fields containing a plurality of harmonic magnetic fields with high amplitudes, so that the harmonic magnetic fields can interact with the magnetic fields generated by the armature windings of the permanent motor to realize the superposition of multi-part torques due to multi-harmonics, thereby further enhancing the outputted torque of the motor. In addition, with the invention, the harmonic magnetic fields can be completely decoupled on the frequency, thereby significantly improving the fault tolerance performance of the motor.

BRIEF DESCRIPTION OF THE DRAWINGS

In all figures, the same elements or structures are denoted by the same reference numerals, in which.

1: rotor core, 2: N pole, 3: S pole, 4: central axle hole, 5: stator core, and 6: modulation block.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

Some basic principles involved in the present invention are as follows: at least two adjacent N pole and S pole have different widths, so that a stator or a rotor can generate at least two harmonic magnetic fields with high amplitudes, and the harmonic magnetic fields can all be used as working harmonics to interact with the magnetic fields generated by the armature windings of the permanent magnet motor so as to realize the superposition of multi-part torques, which is equivalent to superimposing two motors with two different numbers of pole pairs into the same motor. Therefore, with the present invention, the torque density of the motor is increased, thereby further increasing the output torque of the motor. In addition, with the present invention, the harmonic magnetic fields can be completely decoupled on the frequency, thereby significantly improving the fault tolerance performance of the motor.

Figure 3A:
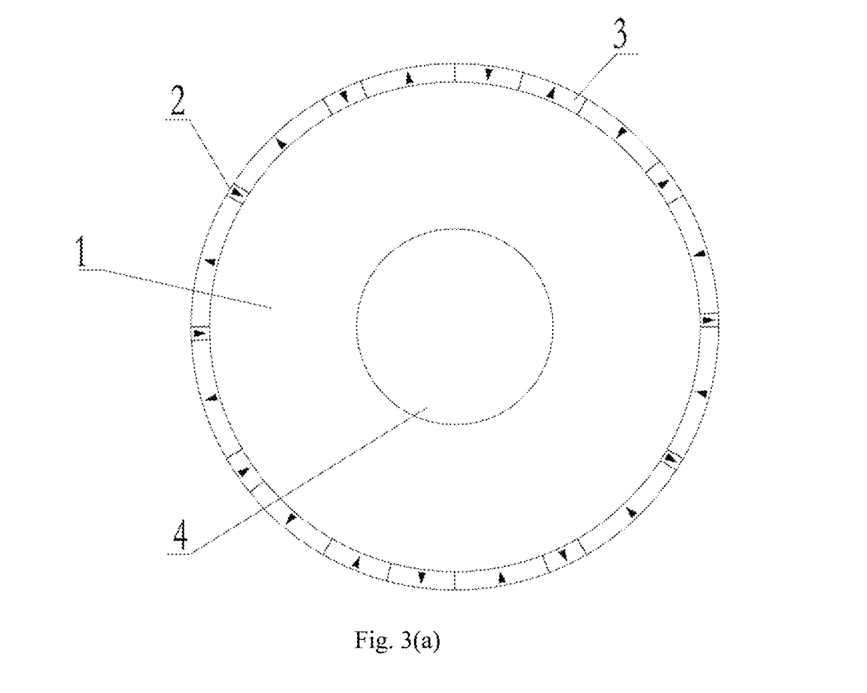
FIG. 3(a) is a schematic structural diagram of a rotor according to a first embodiment of the present invention.

A first embodiment of the present invention is shown in FIG. 3(a) and the stator is omitted in the figure. Specifically, the rotor in this embodiment is a surface-mounted inner rotor, comprising a rotor core 1, eleven N-pole permanent magnets 2 and eleven S-pole permanent magnets 3. A central axle hole 4 is provided inside the rotor core 1, and eleven N-pole permanent magnets 2 and eleven S-pole permanent magnets 3 are alternately distributed on the outer surface of the rotor core 1 in a circumference direction.

The permanent magnet material in this embodiment may be a magnetic material such as ferrite material, ferro-nickel-aluminium (AlNiCo) material and neodymium-iron-boron (NdFeB) material. Each magnetic pole has only one permanent magnet. In the figure, the arrows indicate the magnetization directions of the respective permanent magnets, in which the permanent magnet whose arrow points toward the center of the circle is a N-pole permanent magnet, and the permanent magnet whose arrow points away from the center of the circle is a S-pole permanent magnet. For ease of illustration, the respective permanent magnets in this embodiment have the same width as that of the corresponding magnetic poles. As shown in FIG. 3(a), starting from the position indicated by the reference numeral 3, the widths of the respective magnetic poles (that is, the widths of the respective permanent magnets in this embodiment) are sequentially 15°, 15°, 21° 9°, 27°, 3°, 30°, 3°, 27°, 9°, 21°, 15°, 15°, 21°, 9°, 27°, 3°, 30°, 3°, 27°, 9° and 21° in the counterclockwise direction.

Figure 3B:
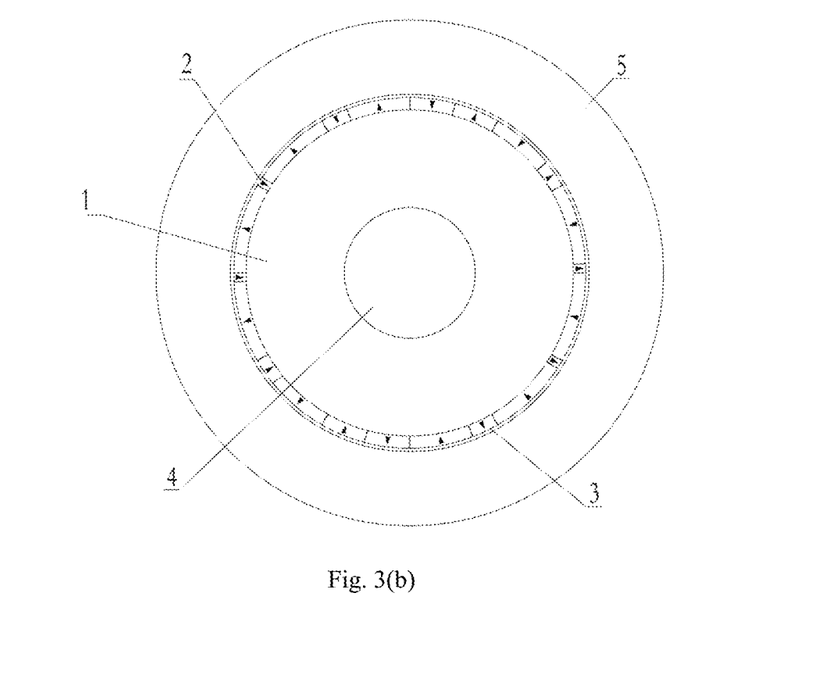
FIG. 3(b) is a schematic structural diagram of a permanent magnet motor using the rotor shown in FIG. 3(a)
Figure 3C:
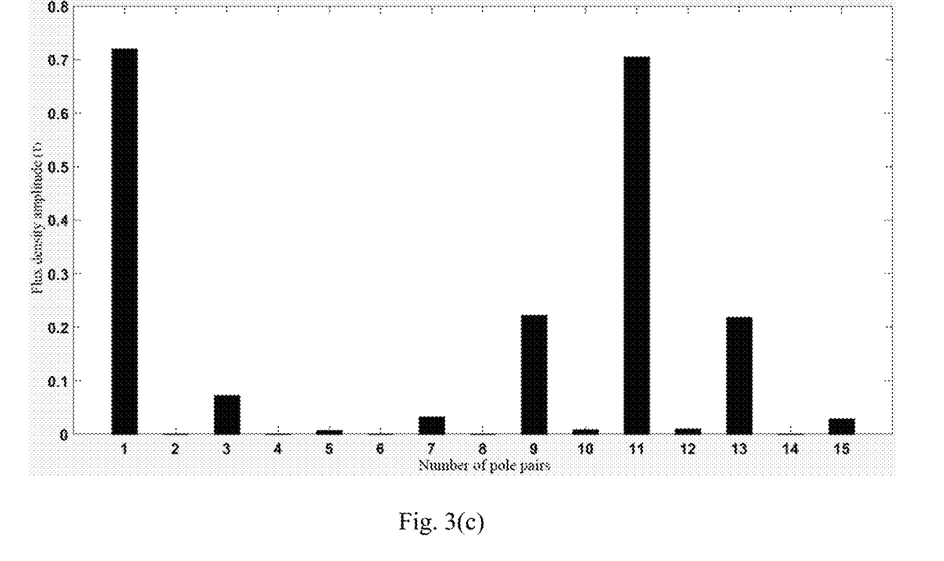
FIG. 3(c) is a diagram showing flux density amplitude distribution in FIG. 3(b)

As shown in FIG. 3(b), a permanent magnet motor using the rotor shown in FIG. 3(a) comprises a rotor core 1 and a stator core 5. Both the rotor core 1 and the stator core 5 are formed by laminated silicon steel sheet, and windings on the stator core 5 are omitted in FIG. 3(b). The corresponding air gap flux density distribution is shown in FIG. 3(c). It can be seen from FIG. 3(c) that for the permanent magnet motor shown in FIG. 3(b), two working harmonics with high and comparable amplitudes are distributed in the air gap, and the numbers of pole pairs are respectively 1 and 11. In this case, the corresponding windings can be provided on the stator to produce a stable output torque. In this embodiment, it is equivalent to superposing a motor with the number of pole pairs of 1 and a motor with the number of pole pairs of 11, that is, one motor has two numbers of pole pairs at the same time, and thus, the number of pairs of permanent magnets cannot be directly used as the number of pole pairs of the motor as in FIG. 1(a) and FIG. 2(a).

Also, as can be seen from FIG. 3(c), the present invention does not intend to suppress or eliminate non-working harmonics as much as the conventional thinking in the art, but instead amplifies the non-working harmonics which are originally to be suppressed or eliminated in the art such that one of the non-working harmonics also becomes a working harmonic, namely, a motor with two working harmonics and two numbers of pole pairs is obtained. This provides a new direction for the design of a permanent magnet motor that is different from the traditional thinking.

Figure 3D:
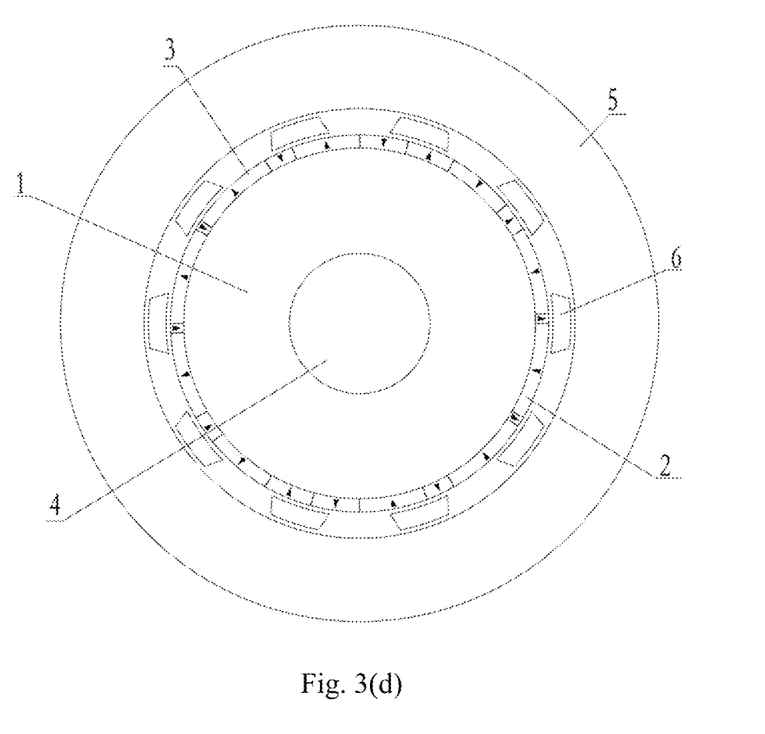
FIG. 3(d) is a schematic structural diagram of a dual-mechanical-port permanent magnet motor using the rotor shown in FIG. 3(a)

FIG. 3(d) shows another permanent magnet motor using the rotor shown in FIG. 3(a). This motor differs from the motor in FIG. 3(b) in that modulation blocks 6 are provided between the rotor and the stator. The rotor core 1, the stator core 5 and the modulation blocks 6 are all formed by the silicon steel material, and both the rotor and the modulating blocks are rotatable and jointly form a double mechanical output port, which can be used as a speed transforming transmission for wind power generation, electric vehicles and other industries.

Figure 4A:
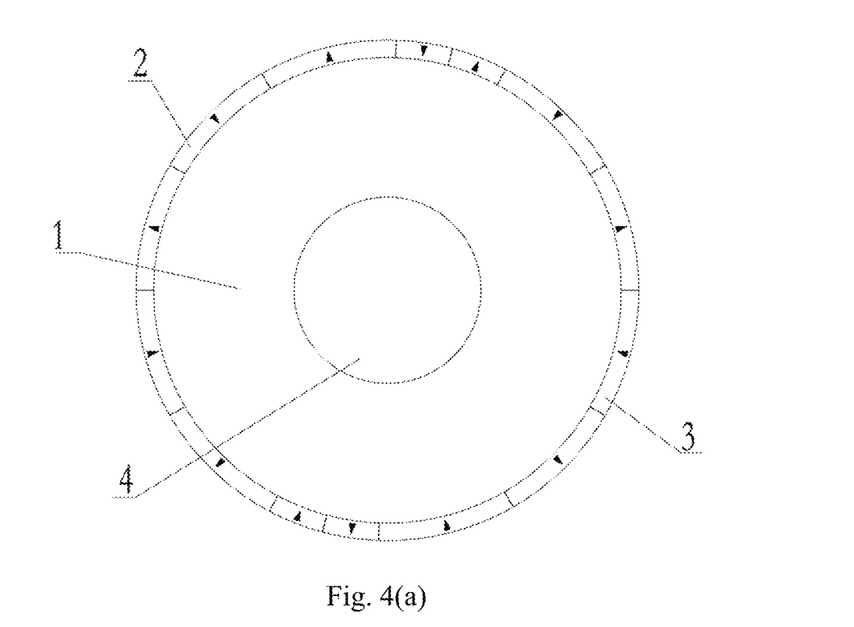
FIG. 4(a) is a schematic structural diagram of a permanent magnet motor rotor according to a second embodiment of the present invention.
Figure 4B:
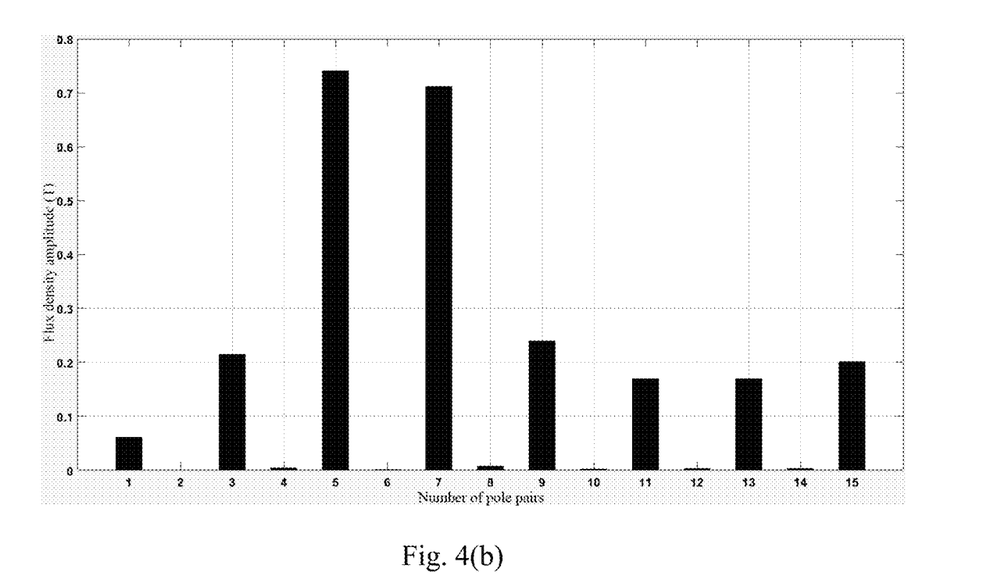
FIG. 4(b) is a diagram showing flux density amplitude distribution of a permanent magnet motor using the rotor shown in FIG. 4(a)

FIG. 4 shows a second embodiment of the present invention, which differs from the first embodiment in that there are seven S poles and seven N poles, and the width design is also different from that in the first embodiment. In this embodiment, the rotor also has two working harmonics and two corresponding numbers of pole pairs of 5 and 7, which is equivalent to superposing a motor with the number of pole pairs of 5 and a motor with the number of pole pairs of 7. In this embodiment, for ease of illustration, the respective permanent magnets have the same width as that of the corresponding magnetic poles. As shown in FIG. 4(a), starting from the position indicated by the reference numeral 3, the widths of the respective magnetic poles (that is, the widths of the respective permanent magnets in this embodiment) are sequentially 30°, 30°, 32°, 13°, 13°, 32°, 30°, 30°, 30°, 32°, 13°, 13°, 32° and 30° in the counterclockwise direction.

Figure 5A:
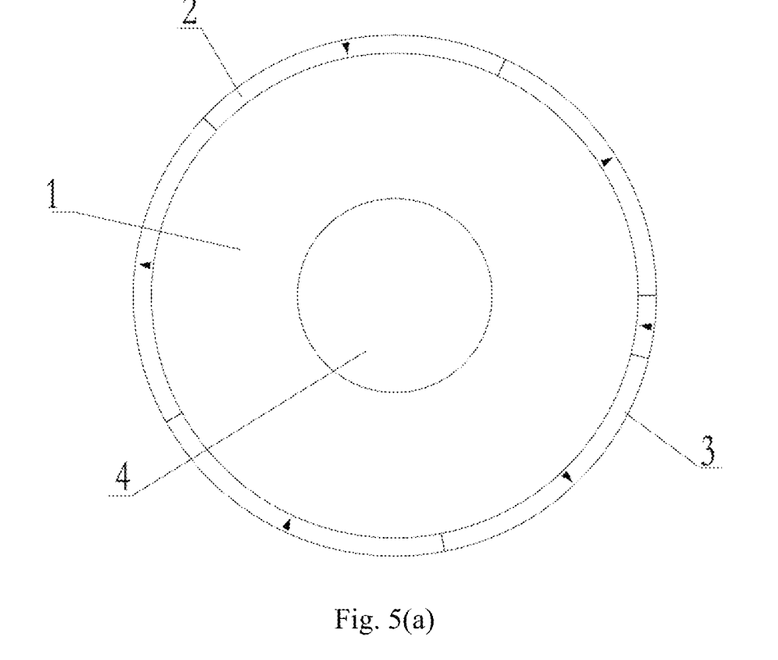
FIG. 5(a) is a schematic structural diagram of a permanent magnet motor rotor according to a third embodiment of the present invention.

FIG. 5(a) shows a third embodiment of the present invention, which differs from the first embodiment in that there are three S poles and three N poles. Furthermore, the three S poles and two N poles have the same width, and the other N pole has a width different from that of the five poles. In this embodiment, there are also two working harmonics and two corresponding numbers of pole pairs of 2 and 3, which is equivalent to superposing a motor with the number of pole pairs of 2 and a motor with the number of pole pairs of 3.

Figure 5B:
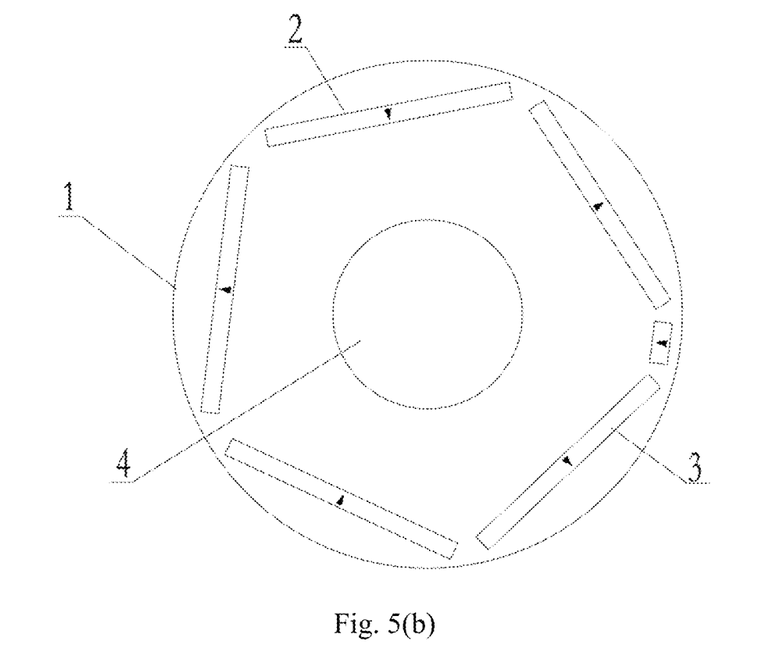
FIG. 5(b) is a diagram showing a variant of the embodiment in the FIG. 5(a)

FIG. 5(b) shows a variant of the embodiment in FIG. 5(a), which differs from the embodiment in FIG. 5(a) in that the permanent magnets are embedded in the rotor core 1 in the circumferential direction. In addition, the permanent magnets in the this embodiment are not adjacent to each other, that is, the width of the permanent magnet is not equal to the width of the corresponding magnetic pole, but the widths of the respective magnetic poles are not changed compared to the scheme of FIG. 5(a).

Figure 5C:
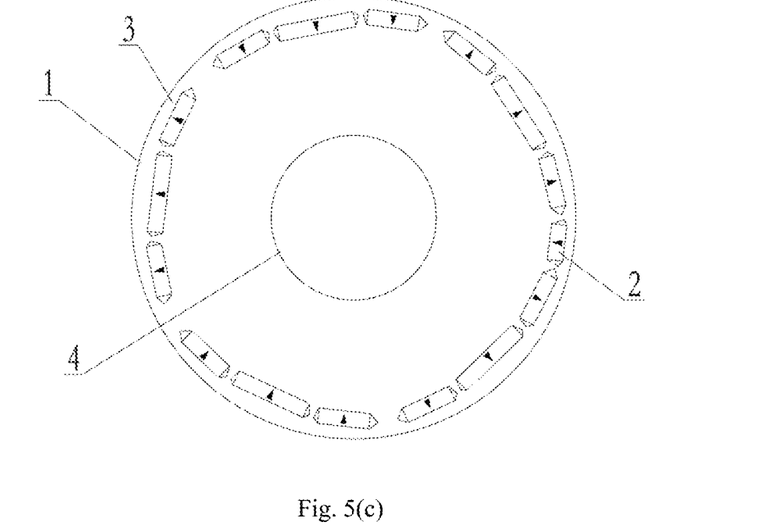
FIG. 5(c) is a diagram showing a variant of the embodiment in the FIG. 5(b)

FIG. 5(c) shows a variant of the embodiment in FIG. 5(b), which differs from the embodiment in FIG. 5(b) in that the permanent magnet in each of the five magnetic poles with the same width is divided into three small pieces. The division principle of the permanent magnets is the same as the division principle in FIG. 2(a) in the "Description of the Related Art." Therefore, the permanent magnet can also be divided into other numbers of small pieces according to specific conditions.

Figure 6A:
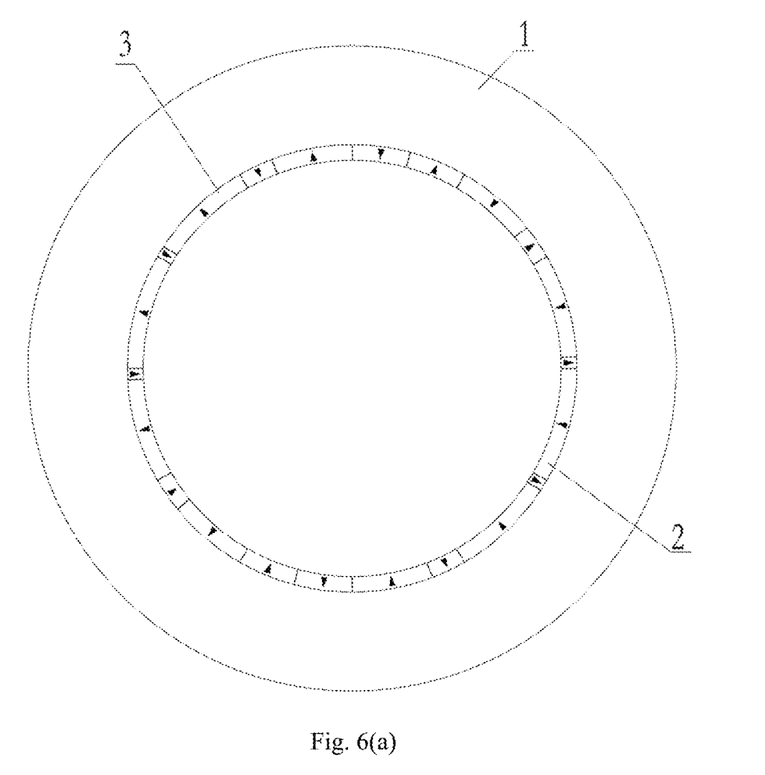
FIG. 6(a) is a schematic structural diagram of a permanent magnet motor rotor according to a fourth embodiment of the present invention.

FIG. 6(a) shows a fourth embodiment of the present invention, which differs from the first embodiment in that, the rotor is a surface-mounted outer rotor in which N poles and S poles are alternately distributed on the inner surface of the rotor core 1 in the circumferential direction of the rotor core 1.

Figure 6B:
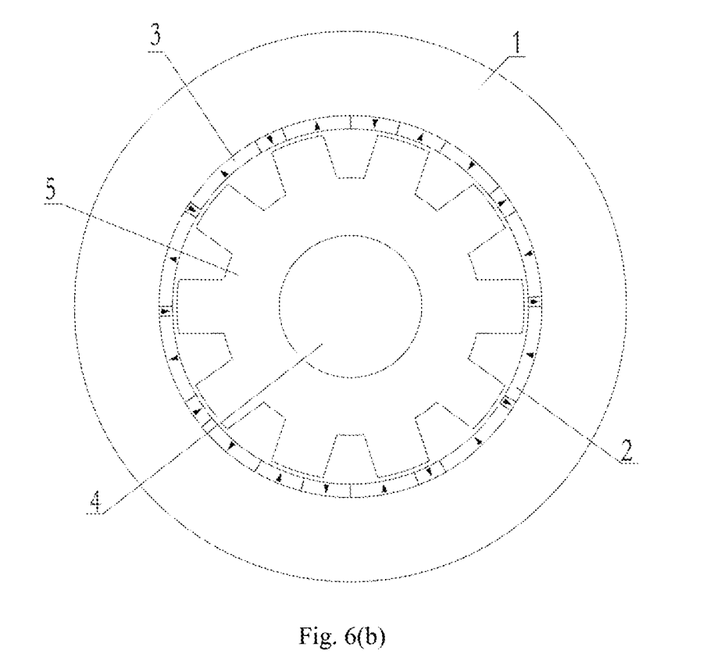
FIG. 6(b) is a schematic structural diagram of a permanent magnet motor using the rotor shown in FIG. 6(a)

As shown in FIG. 6(b), a permanent magnet motor using the rotor shown in FIG. 6(a) comprises a rotor core 1 and a stator core 5. The stator core 5 is disposed in the rotor cavity, the stator core 5 is internally provided with a central axle hole 4, and eleven N-pole permanent magnets 2 and eleven S-pole permanent magnets 3 are alternately distributed on the inner surface of the rotor core 1 in the circumferential direction.

Figure 7:
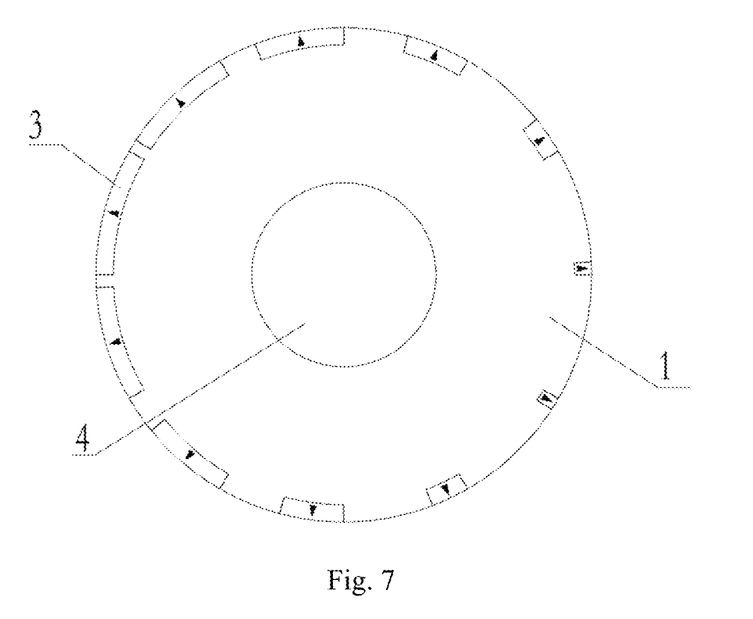
FIG. 7 is a schematic structural diagram of a rotor according to a fifth embodiment of the present invention.

FIG. 7 shows a fifth embodiment of the present invention, which differs from the first embodiment in FIG. 3(a) in that, a permanent magnet in FIG. 3(a) is replaced with the material of the rotor core 1 every a permanent magnet, that is, all N-pole permanent magnets or all S-pole permanent magnets are replaced with the material of the rotor core 1. In this embodiment, all N-pole permanent magnets are replaced with the material of the rotor core. Since the material of the rotor core is different from that of the permanent magnets, the core does not have magnetic properties but serves as a path for the magnetic field. After replacing the N-pole permanent magnets, the S-pole permanent magnets and the rotor core 1 form a consequent-pole structure. Under the action of the magnetic fields of the S-pole permanent magnets, the N poles do not disappear and remains in the original position. Compared with the structure in FIG. 3(a), in this embodiment, half the number of permanent magnets can be saved and the motor using the rotor can still obtain the working harmonic distribution shown in FIG. 3(b), namely, still make a motor have multiple working harmonics.

Figure 8A:
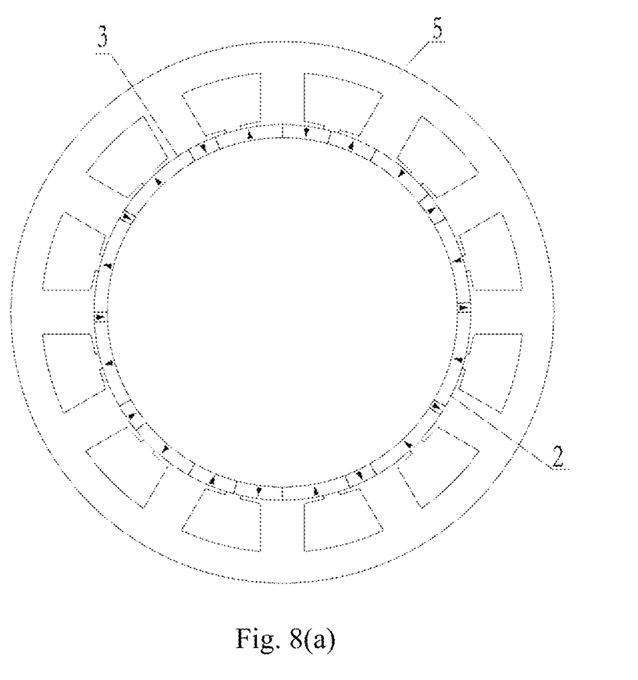
FIG. 8(a) is a schematic structural diagram of a stator according to a sixth embodiment of the present invention.

FIG. 8(a) shows a sixth embodiment of the present invention including a surface-mounted outer stator, which differs from the first embodiment shown in FIG. 6(a) in that the rotor core 1 of the outer rotor of FIG. 6(a) is replaced with a stator core 5 of the outer stator and the arrangement of the N-pole permanent magnets and the S-pole permanent magnets is not changed.

Figure 8B:
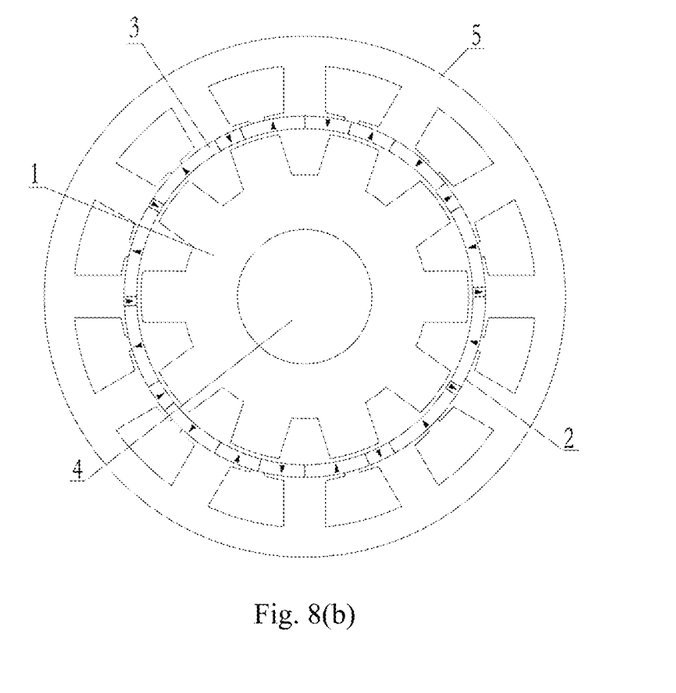
FIG. 8(b) is a schematic structural diagram of a permanent magnet motor using the stator shown in FIG. 8(a).

FIG. 8(b) shows a permanent magnet motor using the stator shown in FIG. 8(a). The rotor core 1 of the permanent magnet motor is formed by laminating only silicon steel sheets, and is a salient-pole structure with a center axle hole 4. Moreover, the N-pole permanent magnets and the S-pole permanent magnets are alternately distributed on the inner surface of the stator core 5 in the circumferential direction.

In other embodiments (not shown), the motor stator windings may employ lap windings, fractional slot concentrated windings or dual-wave starting windings.

While particular embodiments of the present invention have been shown and described, it will be obvious to those skilled in the art that changes and modifications may be made without departing from the spirit and scope of the present invention.

The invention claimed is:

1. A rotor, configured to improve torque density for a multi-working-harmonic permanent magnet motor that is designed to rotate continuously, comprising:
   a rotor core, a plurality of N poles and a plurality of S poles, wherein
   the N poles and the S poles are alternately distributed in a circumferential direction of the rotor core;
   any N pole includes at least one N-pole permanent magnet, and any S pole includes at least one S-pole permanent magnet; and
   at least two pairs of adjacent N pole and S pole such that the N pole and S pole in each pair has different widths, and a width of one of the N pole or the S pole in one pair of the two pairs is different from a width of any one of the N pole or the S pole in the other pair of the two pairs.

2. The rotor of claim 1, wherein at least one N pole and one S pole are symmetrical about the axis of the rotor core, and have the same width.

3. A multi-working-harmonic permanent magnet motor, comprising
   the rotor of claim 1; and
   a stator,
   wherein the multi-working-harmonic permanent magnet motor is a stable torque motor configured to generate at least two working harmonic magnetic fields to improve torque density for the multi-working-harmonic permanent magnet motor.

4. The multi-working-harmonic permanent magnet motor of claim 3, wherein
   the multi-working-harmonic permanent magnet motor further comprises a plurality of modulation blocks, in which the plurality of modulation blocks are uniformly distributed between the stator and the rotor and are rotatable about the axis of the rotor, and the modulation blocks and the rotor jointly form a double mechanical output port.

5. The multi-working-harmonic permanent magnet motor of claim 4, wherein
   the materials of the modulation blocks, the rotor core and the stator core are all silicon steel.

6. The multi-working-harmonic permanent magnet motor of claim 3, wherein a number of pole pairs of a stator magnetic fields equal to a number of pole pairs of a rotor magnetic fields.

7. The multi-working-harmonic permanent magnet motor of claim 3, wherein a magnetic field rotation speed and direction of the stator is the same as a magnetic field rotation speed and direction of the rotor.

8. The multi-working-harmonic permanent magnet motor of claim 3, wherein magnetic field axes of the stator and the rotor are not collinear.

9. The multi-working-harmonic permanent magnet motor of claim 3, wherein:
- a number of pole pairs of a stator magnetic fields equal to a number of pole pairs of a rotor magnetic fields;
- a magnetic field rotation speed and direction of the stator is the same as a magnetic field rotation speed and direction of the rotor; and
- magnetic field axes of the stator and the rotor are not collinear.

10. The rotor of claim 1, wherein the rotor generates at least two harmonic magnetic fields, the at least two harmonic magnetic fields are configured to be working harmonics to interact with a magnetic field generated by armature windings and realize superposition of multi-part torques.

11. A rotor, configured to improve torque density for a multi-working-harmonic permanent magnet motor that is designed to rotate continuously, comprising:
- a rotor core, a plurality of N poles and a plurality of S poles, wherein
- the N poles and the S poles are alternately distributed in a circumferential direction of the rotor core;
- any N pole includes at least one material of the rotor core, so that the S poles and the rotor core form a consequent-pole structure, and any S pole includes at least one S-pole permanent magnet, or
- any N pole includes at least one N-pole permanent magnet, and any S pole includes at least one a material of the rotor core, so that the N poles and the rotor core form a consequent-pole structure; and
- at least two pairs of adjacent N pole and S pole such that the N pole and S pole in each pair has different widths, and a width of one of the N pole or the S pole in one pair of the two pairs is different from a width of any one of the N pole or the S pole in the other pair of the two pairs.

12. A stator, comprising:
- a stator core, a plurality of N poles and a plurality of S poles, wherein the N poles and the S poles are alternately distributed in a circumferential direction of the stator core;
- any N pole includes at least one N-pole permanent magnet, and any S pole includes at least one S-pole permanent magnet;
- at least one pair of adjacent N pole and S pole has different widths according to working harmonic fields of the permanent magnets; and
- at least two pairs of adjacent N pole and S pole such that the N pole and S pole in each pair has different widths, and a width of one of the N pole or the S pole in one pair of the two pairs is different from a width of any one of the N pole or the S pole in the other pair of the two pairs.

13. A multi-working-harmonic permanent magnet motor, comprising the stator of claim 12; and
a rotor.

* * * * *